United States Patent
Andre

(10) Patent No.: US 10,760,595 B2
(45) Date of Patent: Sep. 1, 2020

(54) DUAL-VALVE SECURITY UNIT FOR HYDRAULIC CYLINDERS

(71) Applicant: LOHR INDUSTRIE, Hangenbieten (FR)

(72) Inventor: Jean-Luc Andre, Molsheim (FR)

(73) Assignee: LOHR INDUSTRIE, Hangenbieten (FR)

( * ) Notice: Subject to any disclaimer, the term of this patent is extended or adjusted under 35 U.S.C. 154(b) by 0 days.

(21) Appl. No.: 16/073,020

(22) PCT Filed: Mar. 30, 2017

(86) PCT No.: PCT/FR2017/050738
§ 371 (c)(1),
(2) Date: Jul. 26, 2018

(87) PCT Pub. No.: WO2017/191380
PCT Pub. Date: Nov. 9, 2017

(65) Prior Publication Data
US 2019/0032680 A1 Jan. 31, 2019

(30) Foreign Application Priority Data

Mar. 31, 2016 (FR) .................................. 16 52840

(51) Int. Cl.
*F15B 13/01* (2006.01)
*F16K 15/04* (2006.01)
(Continued)

(52) U.S. Cl.
CPC ............ *F15B 13/01* (2013.01); *F16K 15/042* (2013.01); *F15B 15/14* (2013.01); *F15B 15/202* (2013.01); *F15B 2211/72* (2013.01)

(58) Field of Classification Search
CPC ...................................................... F15B 13/01
See application file for complete search history.

(56) References Cited

U.S. PATENT DOCUMENTS

| | | | | |
|---|---|---|---|---|
| 4,081,053 A | * | 3/1978 | Sherman | B62D 33/07 180/89.15 |
| 4,356,760 A | * | 11/1982 | Bouteille | F15B 13/01 137/615 |
| 5,913,810 A | * | 6/1999 | Andre | F15B 13/01 60/420 |

FOREIGN PATENT DOCUMENTS

| | | |
|---|---|---|
| DE | 102009017031 A1 | 10/2010 |
| EP | 0935715 B1 | 1/2004 |
| JP | 2005077275 A | 3/2005 |

OTHER PUBLICATIONS

International Search Report issued in PCT/FR2017/050738 dated Jul. 24, 2017.

\* cited by examiner

*Primary Examiner* — F Daniel Lopez
(74) *Attorney, Agent, or Firm* — Marshall, Gerstein & Borun LLP

(57) ABSTRACT

The security unit ensures, by blocking the hydraulic flow, that the rod of a cylinder is held in position. It includes two preferably twinned isolation devices, each mounted on one of the hydraulic lines supplying fluid to a chamber of the cylinder. Each isolation device includes two series-connected ball-check valves allowing the flow in the direction of inlet of the fluid into the respective chamber; and a longitudinal, separate rod, inserted between the balls but not linked thereto, and capable of being slidably guided towards each of the balls and driving same. The rod is too short to contact both balls simultaneously when the two valves are closed; but it is sufficiently long to push the ball of the second valve, thereby causing it to open, when it slides under the pushing action of the ball of the first valve upon the latter being controlled to be opened.

18 Claims, 6 Drawing Sheets

(51) Int. Cl.
*F15B 15/14* (2006.01)
*F15B 15/20* (2006.01)

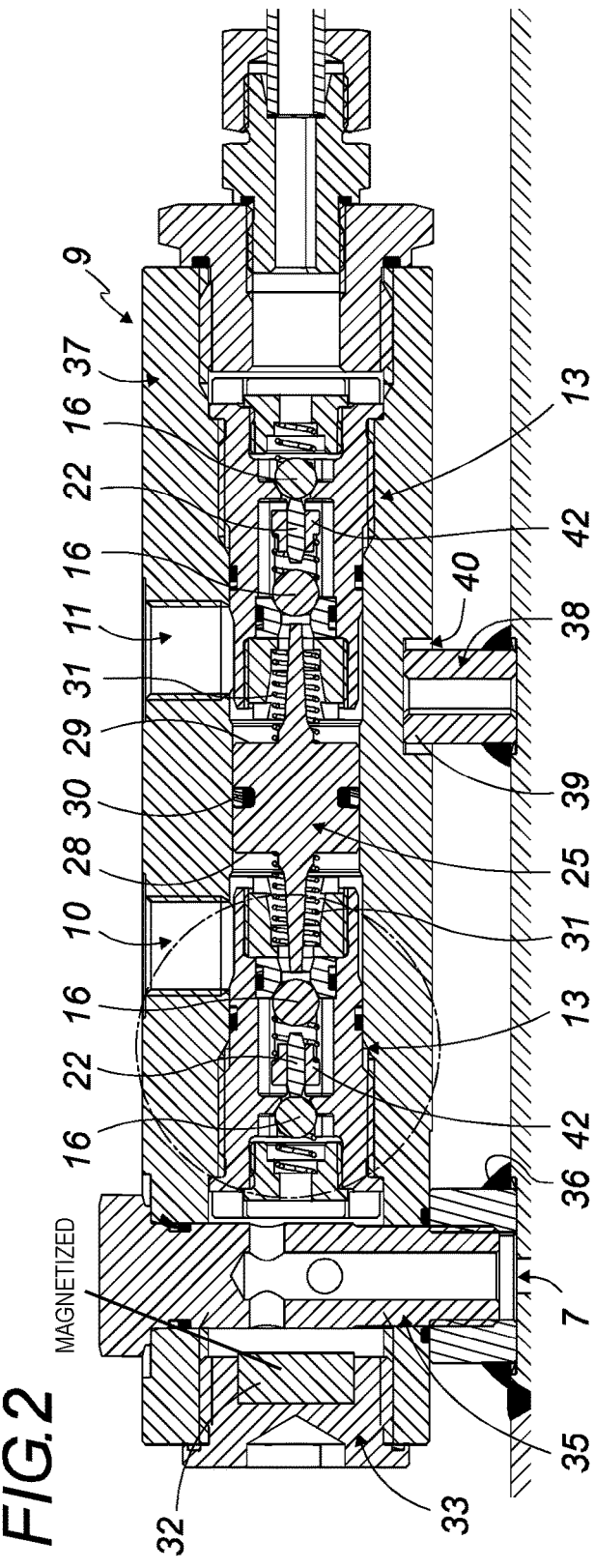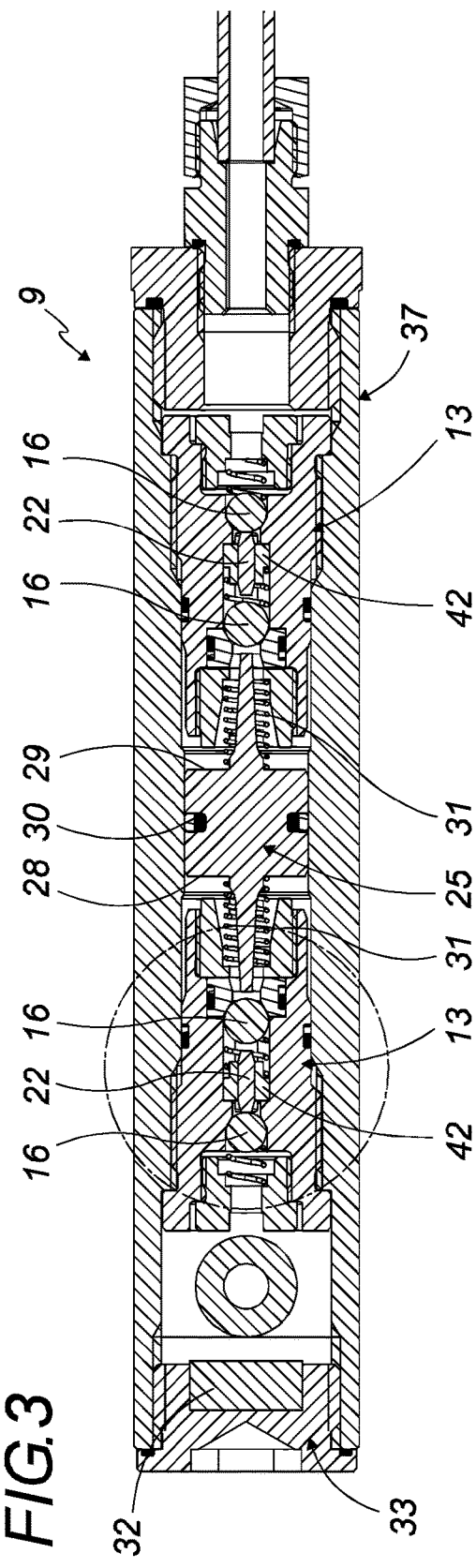

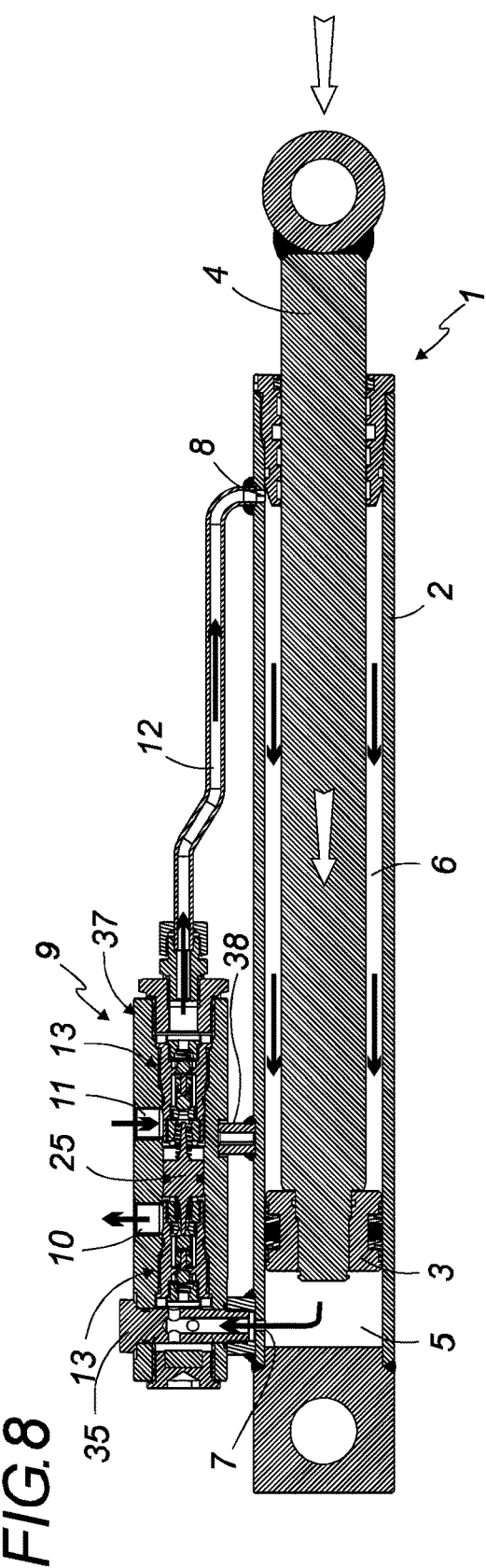
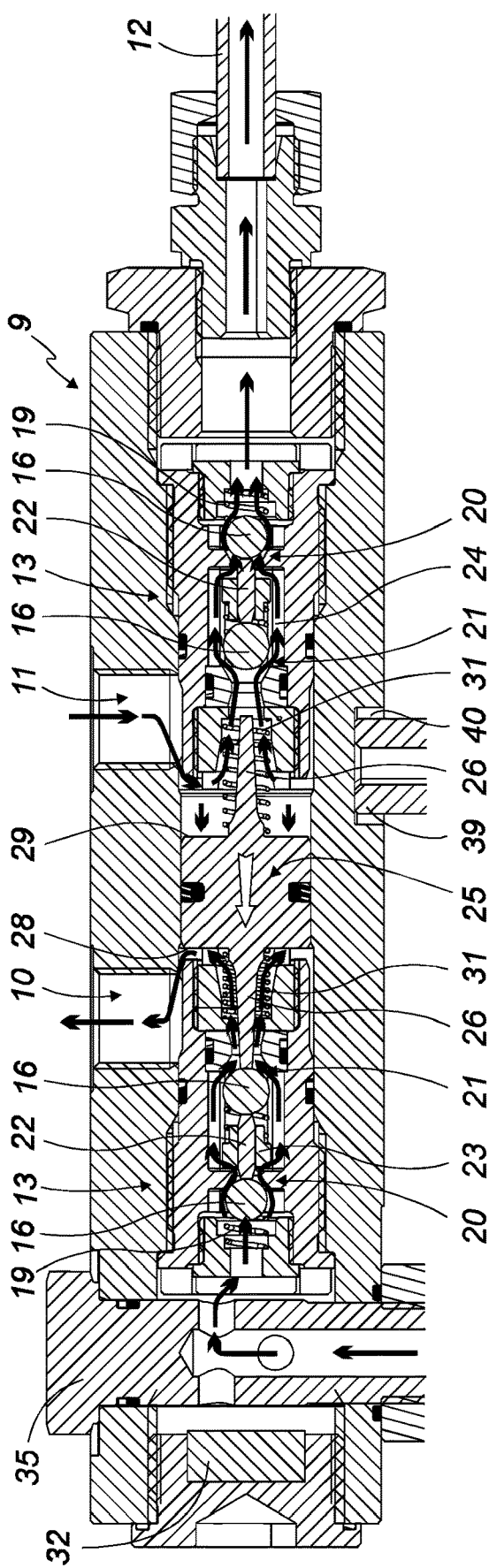
FIG.8
FIG.9

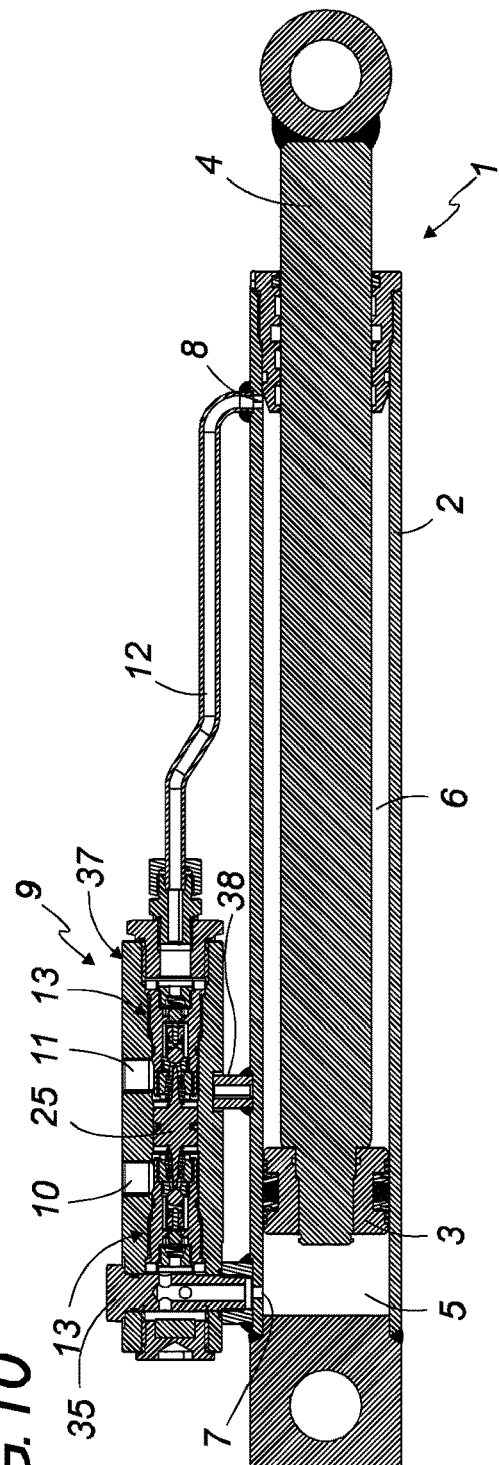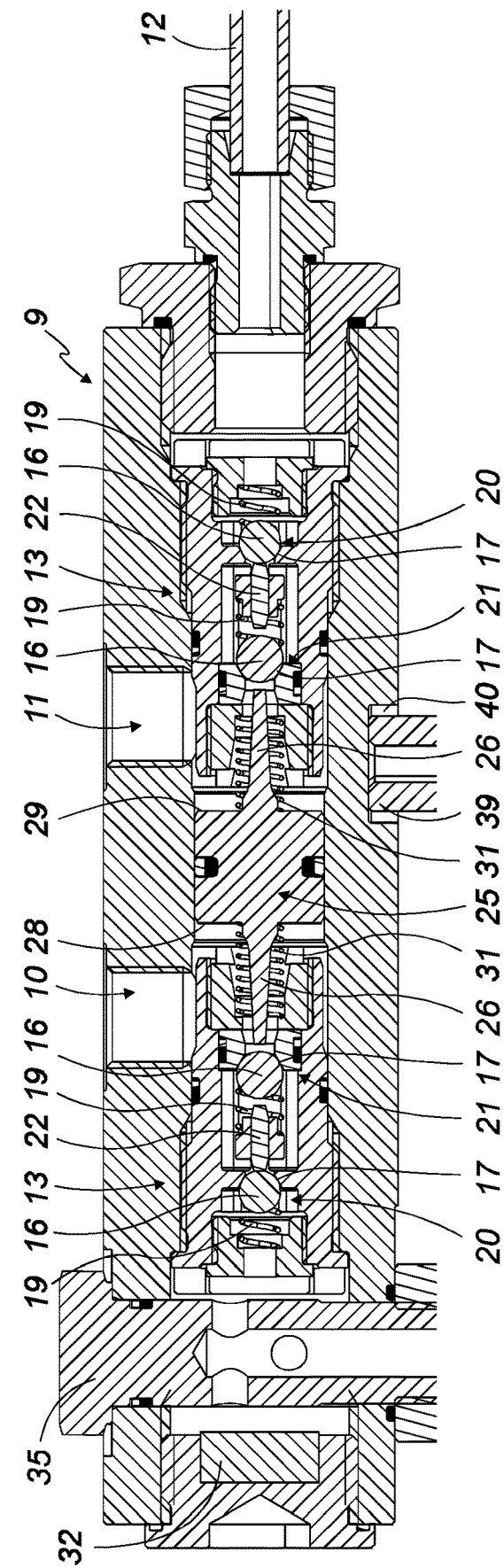

DUAL-VALVE SECURITY UNIT FOR HYDRAULIC CYLINDERS

TECHNICAL FIELD

The present disclosure relates to the technical field of so-called "security" cylinders. It more particularly relates to a security device for keeping the rod of a double-acting hydraulic cylinder in position.

This disclosure for example relates to car-carrier vehicles or any other equipment bearing loads using double-acting hydraulic cylinders.

BACKGROUND

Double-acting hydraulic cylinders are very widely used to lift loads and keep them in the air. They are frequently used in the fields of transport, industry, building, and any fields where it is necessary to perform lifting, lowering and/or maintaining movements of a load involving significant forces. This is for example the case for auto carrier vehicles, which traditionally includes several moving platforms intended to receive the automobiles to be transported, and the position and height of which can be adjusted using different actuators, including double-acting hydraulic cylinders.

For safety reasons, it is absolutely essential to guarantee the maintenance in position of the cylinder rod when its movement is not controlled, even and especially when it bears a load. Indeed, to guarantee the safety of the operators and goods that may be located below, the height of the load must not vary over time without deliberate action by the operator. To that end, unless controlled, the rod of a hydraulic cylinder must be immobilized inwardly or outwardly, irrespective of whether it bears a load.

In the prior art, a cylinder is traditionally kept under a load by using a check valve inserted into the supply circuit of the cylinder with the passing direction going toward the outlet chamber of its rod. However, this assembly for maintaining a load is only provided if it is possible to guarantee the sealing of the valve. Yet a valve may gradually or suddenly have a sealing defect after a certain usage period, for various reasons, for example related to a construction defect, an operating or maintenance problem, or aging of the valve. Such a sealing defect will cause a leak which, even if limited, may, after several hours of retention, cause a slow lowering of the load, which is dangerous for the goods and people located below.

To offset this risk of failure of the valve, in the prior art, mechanical blocking devices have been developed that are associated with these lifting cylinders. This involves a manual blocking system, for example locking pins. However, these mechanical blocking devices are not automatic and must be put in place manually. A risk of forgetting or of incorrect manipulation by the operator is therefore always possible.

Also known from patent EP 0,935,715 is an automatic maintaining device developed with the aim of eliminating the use of these traditional mechanical retaining means. This device is made up of a hydraulic isolating unit that replaces the traditional check valve mounted in the supply circuit of the cylinder. This hydraulic unit, through which the outlet chamber of the rod of the cylinder is supplied, comprises a primary ball-check valve, which is duplicated by a second so-called "security" valve, closed by a rod conical needle. These two successive valves are each arranged at one of the inlets of a sluice, the closing of the security valve being done in a differed manner relative to that of the primary valve. When the operator controls the opening of the device, a control means with a rod opens the security valve by pushing on the conical needle, which moves in the sluice. Through this movement, the rod of the needle pushes the ball of the primary valve, which opens in turn.

This known device has several advantages relative to the prior systems. First, it is safer than the traditional check valve due to the use of two successive valves instead of only one. Furthermore, it allows automatic locking, without operator intervention and in any position of the cylinder rod.

However, this prior device has certain drawbacks that prevent it from guaranteeing the desired complete security. With such a device, there is still a risk of leaking increased because of the hyperstatic nature of the device. Indeed, the sliding of the conical needle is guided by its rod, in a tight and hyperstatic manner. Since this rod is connected to the conical needle of the security valve, the positioning of one of these parts conditions the positioning of the other part that is connected to it. If one of them is oriented incorrectly or has a geometric defect, this causes incorrect positioning of the other. In order for the secondary valve to close correctly, the machining must therefore be done with perfect centering and geometry, the slightest perpendicularity defect being able to cause a leak, since contradictory forces are generated. These leaks can appear from the beginning, in case of construction defect, or later, in case of alteration in the geometry for example related to wear or the presence of a bothersome impurity.

Furthermore, this device locks the oil in only one of the chambers of the hydraulic cylinder. No security is provided to prevent leaking of the oil located in the second chamber of the cylinder located on the rod side. The outlet of the rod is therefore not locked.

For all of these reasons, this prior device is not completely secure.

SUMMARY OF THE DISCLOSURE

The aim of the disclosed embodiments is to propose an alternative security unit, which does not have the drawbacks of this prior system, while retaining its advantages.

To that end, the disclosed embodiments teach a series-connected dual-valve security unit that ensures, by locking the hydraulic flow, the holding in position of the rod of a double-acting hydraulic cylinder comprising a cylinder body, compartmentalized by a movable piston supporting said rod, in a bottom-side chamber and a rod-side chamber, said chambers each communicating with a specific hydraulic conduit allowing the entry or exit of fluid in or out of the chamber in question, the security unit including an isolating device, mounted in one of the hydraulic conduits and through which the corresponding chamber of the cylinder is supplied. Said isolating device comprises a primary valve and a secondary valve, the primary valve being closest to the chamber in question, both passing in the same direction corresponding to the entry of fluid into the chamber in question and arranged in series one after the other.

The security unit includes two isolating devices, each mounted in one of the hydraulic conduits, each of the chambers of the cylinder being supplied through one of said isolating devices.

The two chambers of the cylinder can thus be locked, in order to prevent the oil from escaping therefrom. The rod of the cylinder is completely locked, inwardly as well as outwardly. The maintenance of the position thereof is thus guaranteed in both directions.

Furthermore, the primary valve and the secondary valve of each of said isolating devices are ball-check valves, comprising a seat and a ball.

Each of said isolating devices further includes:
- an independent sliding rod, arranged longitudinally and inserted between the balls of the primary and secondary valves, but not connected to the latter, and able to slide toward each of said balls so as to press by one end thereof against the ball located in front, and
- a guide element for the sliding rod that provides guiding of the sliding rod during its sliding.

Furthermore, in each of said isolating devices, the length of the rod is provided to be short enough so as not to be able to be in contact simultaneously with both of the balls bearing on their respective seats when the two primary and secondary valves are closed; but long enough that the opening command of the secondary valve causes, through the movement of the ball thereof that pushes the corresponding end of the sliding rod, the guided sliding of the sliding rod toward the primary valve and causes the opening of the primary valve the ball whereof is pushed by the other end of the sliding rod.

The two balls of the valves and the rod being fully independent of one another, there is no longer any hyperstaticity problem. Unlike the rod connected to the needle of the prior art, the independent rod of the unit cannot force the balls of the valves into an incorrect position. The balls are automatically centered on their respective seat, without being influenced by the other elements of the system with which they are not in contact. The leak risks are therefore limited and security is reinforced as a result.

According to one preferred embodiment, in at least one of the isolating devices, the primary valve and the secondary valve are not identical.

According to this embodiment, said primary valve and said secondary valve are preferably different by at least one of the following features: the material of the ball or seat, or the diameter of the ball, or the stiffness of the return spring.

The behavior of said two valves and their wear over time will therefore be different. Likewise, the risk of being faced with the same serial construction defect on the component elements of said two valves will be avoided. One thus greatly limits the risk of a simultaneous leak of said two valves and the overall sealing of the isolating device remains guaranteed.

According to one embodiment, the guide element is a substantially cylindrical guide support, in which the sliding rod is mounted, which slides in a guided manner in a bore provided for the ball of the primary valve. Said bore or said guide support includes at least one longitudinal slot allowing the passage of the hydraulic fluid despite the presence of the sliding rod and the guide support in the bore.

According to a preferred embodiment, the security unit comprises a single body in which the two isolating devices are housed.

According to one embodiment, each isolating device comprises a control part located near the secondary valve, on the side opposite to the primary valve. Said control part can move toward the secondary valve and push the ball of the secondary valve to cause it to open.

According to a preferred embodiment, the two isolating devices include a single control part able alternately to cause the secondary valve of each of the two isolating devices to open.

The construction of the device is advantageously simplified as a result. The weight and manufacturing cost of the assembly are reduced. Furthermore, the number of parts, in particular sealing gaskets, to be maintained is thus decreased.

According to this embodiment, the single control part can be a sliding central shuttle arranged between the two isolating devices, able to move alternately toward each of said isolating devices, and which, when it arrives near one of said isolating devices, causes the secondary valve thereof to open.

According to one embodiment, the central shuttle is held in the central position between the two isolating devices by two opposite return springs.

According to one embodiment, the control part includes two protruding lateral fingers, each extending toward one of the isolating devices, and the free end of which pushes the ball of the secondary valve of said isolating device when the control part arrives near the latter, thus causing it to open, said two protruding lateral fingers being provided to be short enough so that their free ends cannot be in contact simultaneously with both balls of the two secondary valves when said balls are bearing on their respective seats in the closed position of the secondary valves.

According to one embodiment, each of the lateral faces of the control part is in communication with one of the hydraulic conduits; and the control part includes a perimetric gasket that opposes the passage of hydraulic fluid from one hydraulic conduit to the other.

According to another embodiment, the security unit further includes at least one magnetized part that attracts polluting metal particles that may be present in the hydraulic fluid. As a result, such polluting particles no longer risk becoming lodged at the seat of the valves where they could cause a leak, or hinder the sliding of a part necessary for the proper operation of the device.

The disclosure also teaches a security double-acting hydraulic cylinder, comprising a cylinder body, a rod and a piston that compartmentalizes the cylinder body into a bottom-side chamber and a rod-side chamber. Said cylinder further includes a security unit.

According to a preferred embodiment, the security unit is integrated into or directly fastened onto the cylinder body.

Advantageously, the security unit can be fastened onto the cylinder body using a hollow screw through which the bottom-side chamber is placed in hydraulic communication with the primary valve of the corresponding isolating device.

Additionally, the security unit can advantageously rest on a pin fastened on the cylinder body, the free end of said pin being engaged in an oblong cavity arranged in the security unit and oriented longitudinally, i.e., along the main axis of the security unit, in order to allow longitudinal play.

BRIEF DESCRIPTION OF THE FIGURES

Other characteristics and advantages will be seen from the following detailed description, given with reference to the appended drawings in which:

FIGS. 2 and 3 are longitudinal sectional views, along a vertical and horizontal cutting plane, respectively, of a security unit according to a preferred embodiment;

FIGS. 6 to 11 are vertical longitudinal sectional views, each time of the entire security cylinder and its security unit, which schematically illustrate the operation of the device, during the deployment of the rod of the cylinder for FIGS. 6 and 7, during the withdrawal of the rod of the cylinder for FIGS. 8 and 9, and in the locked state for FIGS. 10 and 11.

DETAILED DESCRIPTION

Figure 1:
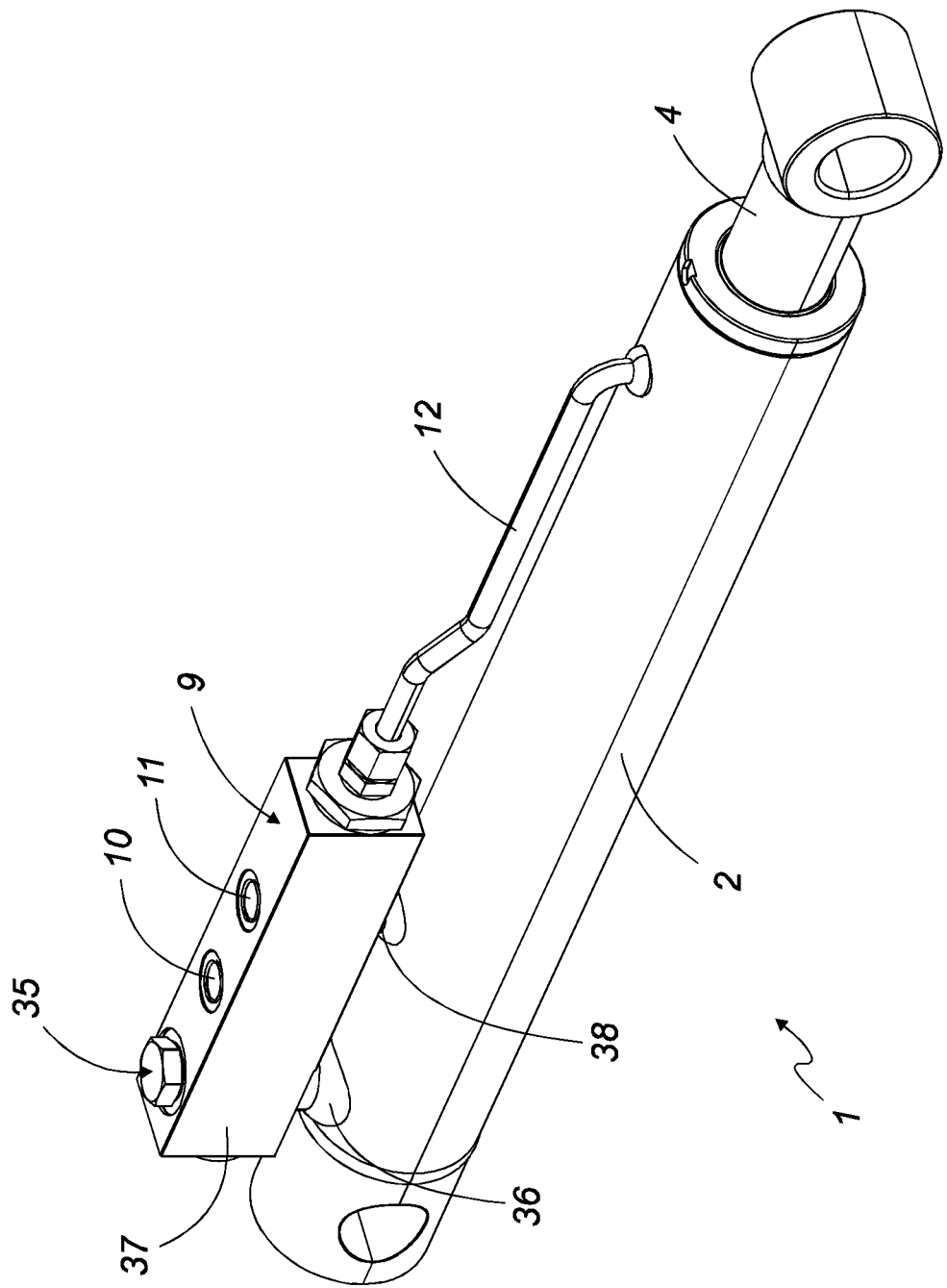
FIG. 1 is a general perspective view of an example of a security cylinder.

FIG. 1 shows an exemplary security cylinder 1.

Said cylinder 1 is a double-acting hydraulic cylinder that includes a cylinder body 2, substantially cylindrical, inside which a piston 3 moves under the effect of the pressure of hydraulic fluid. A rod 4 is traditionally mounted on the piston 3 and extends inside the cylinder body 2 on one side of said piston 3 and to the outside of the cylinder 1, where it can be used to lift loads.

The piston 3 therefore separates the inner space of the cylinder body 2 into two hydraulically independent chambers: a bottom-side chamber 5 and a rod-side chamber 6. Each of said chambers therefore includes a different orifice, respectively 7 and 8, inlet and/or outlet for the hydraulic fluid to fill or empty the chamber in question.

The hydraulic cylinder 1 is equipped with a security unit 9 that is mounted in the hydraulic circuit of the cylinder such that the fluid that supplies and leaves the chambers of the cylinder passes through said security unit 9. It is thus connected on the one hand to the orifices 7 and 8 of the chambers 5 and 6 of the cylinder, and on the other hand it comprises two inlets 10 and 11 that are respectively connected to the hydraulic supply circuit of the bottom-side chamber 5 and of the rod-side chamber 6 of the hydraulic cylinder 1.

In order to avoid any leak risk, said security unit 9 is preferably flanged or integrated with the cylinder body 2 of the cylinder 1. It may also be attached on the latter, for example screwed to the cylinder body 2.

In this case, the hydraulic circuits between the security unit 9 and the chambers of the cylinder are preferably made without flexible piping, and preferably without any piping between the security unit 9 and the bottom-side chamber 5 of the cylinder. It is to that end thus possible, for example, to advantageously use a hollow screw 35 that serves both to provide the direct fastening of the security unit 9 on the cylinder body 2 of the cylinder and to provide, via the inner channel thereof, the hydraulic connection between the orifice 7 of the bottom-side chamber 5 and the security unit 9. The sealing at this level is preferably completed by a conical gasket 36 placed at the base of said hollow screw 35.

On the other side, a rigid conduit 12 preferably connects the orifice 8 of the rod-side chamber 6 to the security unit 9.

The security unit 9 comprises two isolating devices 13. Said two isolating devices are preferably placed together in a single case or body 37. The device is thus more compact and more cost-effective to manufacture. It is also much simpler and faster to install. Furthermore, one thus decreases the hydraulic connections and leak risks resulting therefrom.

Preferably, the body 37 is oriented longitudinally relative to the cylinder body 2 of the cylinder, i.e., its main axis is parallel to the main axis of the cylinder body 2.

To complete the maintaining, the device may include, in addition to the hollow screw 35, a pin 38 preferably fastened by welding on the cylinder body 2 on which the body 37 of the security unit 9 rests. The free end 39 of said pin 38 is engaged in a cavity 40, preferably oblong and oriented longitudinally, that is arranged in the body 37 of the security unit 9. The security unit 9 is thus tightly fastened at only one of its ends (by the hollow screw 35), its second end simply being retained non-hyperstatically by the engagement of the pin 38 in the cavity 40. Due to the oblong shape of the cavity 40, longitudinal play of the security unit relative to the pin 38 remains possible, which facilitates assembly and makes it possible to absorb the vibrations due to driving without risk of leaks at the hollow screw 35. However, due to this engagement of the pin 38 in the cavity 40, the security unit 9 is blocked in lateral pivoting, which makes it possible to avoid leaks at the junction with the rigid conduit 12.

Each of the isolating devices 13 includes two check valves 14, arranged one after the other, in series. Said check valves 14 are both ball-check valves containing a substantially cylindrical bore 15 in which a ball 16 moves. Said bore 15 ends with a narrow part forming a seat 17 for the ball 16 when it is pressed thereupon, thus closing the valve sealably.

Said seats 17 can be configured directly in the part forming the body of the isolating device 13, or can also be made in an independent part 18 that is mounted on the body of the isolating device, in the extension of the bore 15. Said independent part 18 can advantageously be made from a material other than that of the body of the isolating device 13, in particular bronze, plastic or the like. In this case, a gasket 41, for example an O-ring, can complete the sealing at this level if necessary.

The balls 16 are preferably kept bearing against their seat 17 by a return spring 19 located in the bore 15, which, if it is present, presses them against their seat 17 in the absence of a sufficient force acting on the ball in the opposite direction.

Said two check valves 14 are assembled passing in the same direction, i.e., a direction corresponding to fluid entering the corresponding chamber of the hydraulic cylinder 1.

For simplification reasons, in this patent application: "primary valve 20" refers to the valve 14 located closest to the chamber of the cylinder and "secondary valve 21" refers to the one located toward the hydraulic supply circuit, i.e., furthest from the chamber of the cylinder.

Each isolating device 13 further includes a sliding rod 22, oriented longitudinally in the direction of flow of the fluid and placed between the two balls 16 of the primary 20 and secondary 21 valves. Said sliding rod 22 is an independent part that is not connected to either of the two balls 16 and can slide in a guided manner between them. To that end, a guide element 42 is advantageously provided in order to provide the guiding of the sliding rod 22 during its sliding.

Said guide element 42 can be of any nature allowing it to perform its function. In the illustrated examples, it is a substantially cylindrical guide support 23, in which the sliding rod 22 is mounted, and the diameter of which is advantageously chosen to allow guided sliding of the sliding rod 22/guide support 23 assembly in the bore 15 provided for the ball 16 and the return spring 19 of the primary valve 20.

Figure 4:
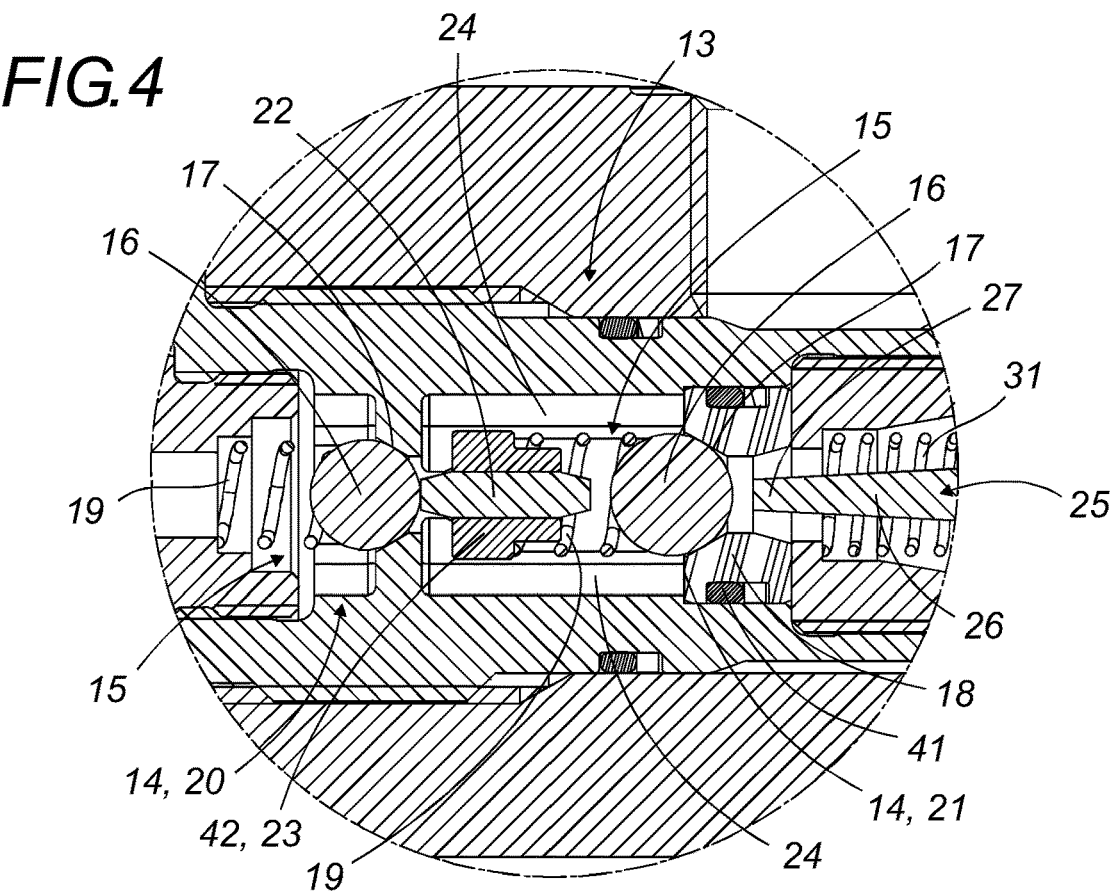
FIGS. 4 and 5 are enlargements of the circled details in FIGS. 2 and 3, respectively.
Figure 5:
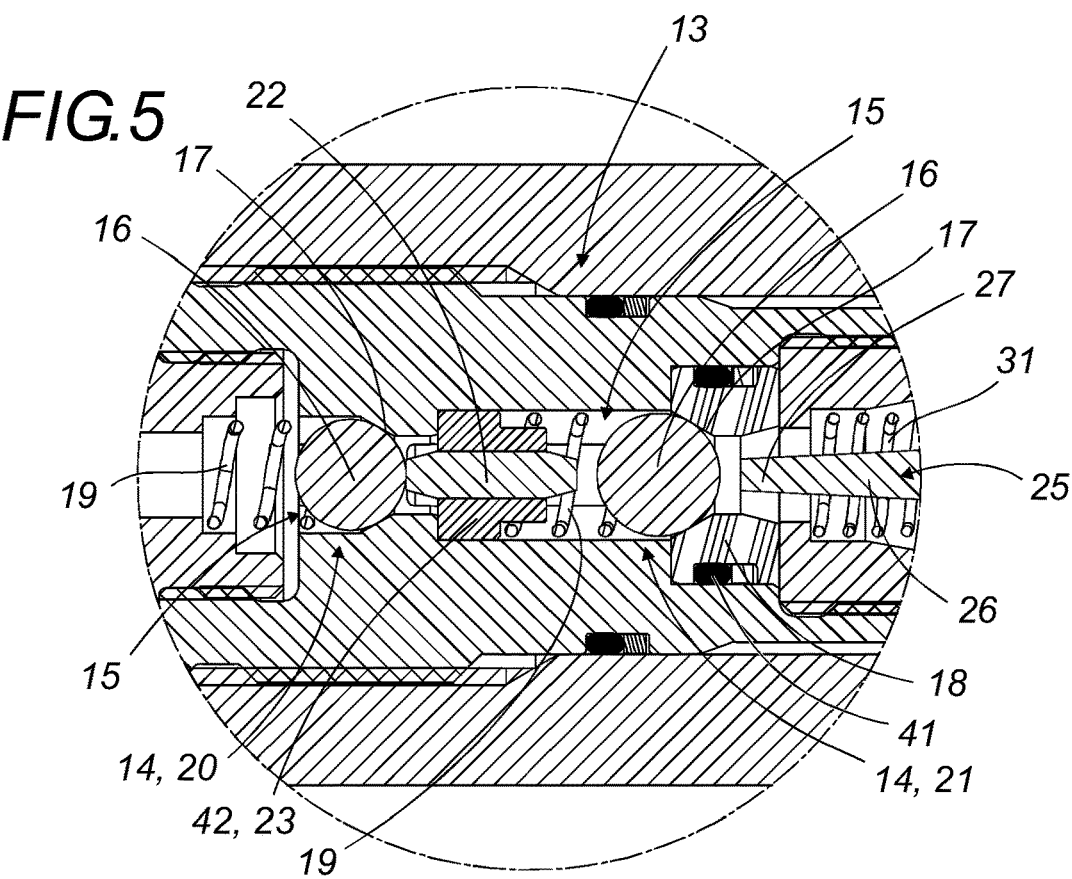

In order to allow the flow of the hydraulic fluid despite the presence of the sliding rod 22 and its guide support 23 in said bore 15, one or several longitudinal slots 24 can advantageously be arranged in the walls of the bore 15 or in the guide support 23. One example of such longitudinal slots is for example shown in the enlargement of FIG. 4 and visible by comparison with the enlargement of FIG. 5 done in another cutting plane.

The sliding rod 22 can thus slide freely from one side to the other of the bore 15 without hindering the flow of the hydraulic fluid, and can thus move toward each of the balls 16 of the primary 20 and secondary 21 valves that surround it, until pressing by one of the ends thereof against the ball 16 located in front.

However, by construction, the sliding rod 22 is too short to be able to be in contact simultaneously with both of the balls 16 when the latter are pressing against their respective seats 17, in the closed position of the two primary 20 and secondary 21 valves. There is therefore longitudinal play between the rod 22 and the two balls 16 bearing on their respective seats 17. Therefore, and even in case of incorrect positioning, the sliding rod 22 cannot hinder the closing of the two valves simultaneously and be responsible for a leak through the isolating device 13.

As explained in the introductory part, the primary valve 20 and the secondary valve 21 are preferably made without a shared mode, i.e., they are different from one another and the parts thereof playing a role in sealing are not identical in order to reinforce security.

It is thus possible to provide, for example, two balls 16 with a different diameter and/or made from different materials. Likewise, the seats 17 of the two valves can be made from different materials, for example one from steel and the other from bronze. It is also possible to provide one directly configured in the body of the isolating device 13, while the other is on a different, attached independent part. The return springs 19 used can also be chosen to be different from one another and advantageously to have different stiffnesses.

The two valves 20, 21 thus being completely different from one another, it is thus highly unlikely that they will leak at the same time, whether at the beginning or over time. Indeed, the parts not coming from the same series, have a very low likelihood of having the same construction flaws. Furthermore, being of different natures, sizes and compositions, they evolve differently over time and do not react in the same way to the different attacks that they may encounter. A simultaneous leak of said two valves is therefore highly improbable, which makes the isolating devices 13 and the security unit 9 that contains them extremely safe.

In order for the operator to be able to control the opening of each of said devices, the security unit 9 further includes a control part 25 that may cause the opening of the secondary valve 21 when the operator so wishes. Said control part 25 is preferably located near the secondary valve 21, on the side opposite the primary valve 20. This is preferably a mechanical part that moves toward the secondary valve 21, in order to push the ball 16 of said valve to cause it to open.

As shown, to that end the control part 25 can advantageously include a protruding lateral finger 26, which extends toward the secondary valve 21 and the free end 27 of which can engage through the seat 17 of said valve, in order to push the ball 16 and thus cause said secondary valve 21 to open.

As shown, the control part 25 can advantageously be a sliding shuttle serving as a border for the two separated hydraulic circuits that independently supply the two chambers 5 and 6 of the cylinder 1. Each of the lateral faces 28 and 29 of said shuttle is thus in communication with one of said hydraulic circuits.

A perimetric gasket 30 mounted on said shuttle can optionally complete the barrier formed by the latter and provide the sealing between the two hydraulic circuits, while allowing the longitudinal sliding of the control part 25. Said gasket thus makes it possible to guarantee that all of the hydraulic fluid sent is found in the corresponding chamber of the cylinder and causes a withdrawal or deployment of the rod 4 of the cylinder with the expected length. This is particularly important in the case where the cylinder is part of a set of several cylinders needing to act symmetrically.

Without said gasket, part of the hydraulic fluid sent could pass to the other side and escape through the other inlet, thus causing a loss of hydraulic pressure that is not necessarily bothersome depending on the applications.

With such an embodiment, the movement of the control part 25 toward the secondary valve 21 is caused automatically by the pressure of the hydraulic fluid, as will be explained below, when the operator controls the opening of said valve.

Without the command from the operator, the control part 25 is preferably kept separated from the secondary valve 21 by a return spring 31.

In the illustrated preferred embodiment, said two isolating devices 13 are further twinned, i.e., their operation is connected to one another and is not independent.

To that end, the security unit 9 only includes a single control part 25, arranged between the two isolating devices 13, capable of alternately causing the opening of the secondary valve 21 of each of said two isolating devices 13.

Said single control part 25 is preferably a sliding central shuttle that includes, on each of said lateral faces 28 and 29, a protruding lateral finger 26, extending toward one of the isolating devices 13. Thus, when said control part 25 moves toward one of the isolating devices 13, the free end of the protruding lateral finger 26 located in front of it pushes the ball 16 of the secondary valve 21 in question and thus causes it to open.

As before, the lateral fingers 26 of the control part 25 are provided by construction to be too short to simultaneously reach both balls 16 of the facing secondary valves 21. Longitudinal play is thus guaranteed, and even in case of incorrect positioning, the control part 25 cannot cause the simultaneous opening of both secondary valves 21.

Advantageously, the control part 25 can be kept in the central position, between the two isolating devices 13, by two opposite return springs 31, which, when they are present, each act on one of the lateral faces 28, 29 of the single control part 25 to return it to the substantially central position. Likewise, when the single control part 25 is in said central position, the lateral fingers 26 thereof are too short by construction to reach the balls 16 of the facing secondary valves 21.

The security unit 9 may further include one or several magnetized parts 32, placed so as to be in contact with the hydraulic fluid flowing in one of the hydraulic circuits traversing the security unit 9. Said magnetized part 32 serves to attract any metal particles that may be present in the hydraulic fluid in order to rid it of these polluting impurities.

Thus retained by the magnetized part 32, these particles are no longer able to be deposited at the seats 17 of the various valves or their gaskets and can no longer cause incorrect closing of said valves or a deposit hindering the operation of the device. The reliability of the device over time is therefore still further enhanced.

When the security unit 9 includes only one, said magnetized part 32 is preferably arranged in the hydraulic circuit supplying the chamber that is a priority for the safety, generally the bottom-side chamber 5 as previously explained.

Although not shown in the figures, an alternative including two magnetized parts 32 each located in one of the hydraulic circuits for supplying the chambers 5 and 6 of the cylinder can be considered.

As shown, the magnetized part 32 can advantageously be arranged at the plug 33 of the security unit 9. It can thus easily be installed and optionally cleaned during subsequent maintenance operations.

The operation of the security unit 9 follows obviously from the means described above and will now be explained in more detail, in reference to FIGS. 6 to 11, which illustrate the operation of the illustrated preferred embodiment.

In order to facilitate understanding, in these figures, the flow of the hydraulic fluid is symbolized by thin black arrows and the movement of the mechanical parts by thick white arrows.

For simplification only, hereinafter, "bottom-side isolating device" will refer to an isolating device 13 placed on the hydraulic circuit supplying the bottom-side chamber 5 of the cylinder 1, and "rod-side isolating device" will refer to an isolating device 13 placed on the hydraulic circuit supplying the rod-side chamber 6 of the cylinder 1.

The security unit 9 has three different operating states, depending on whether the operator commands the deployment or withdrawal of the rod 4 of the cylinder, or if there is no command from the operator.

Figure 6:
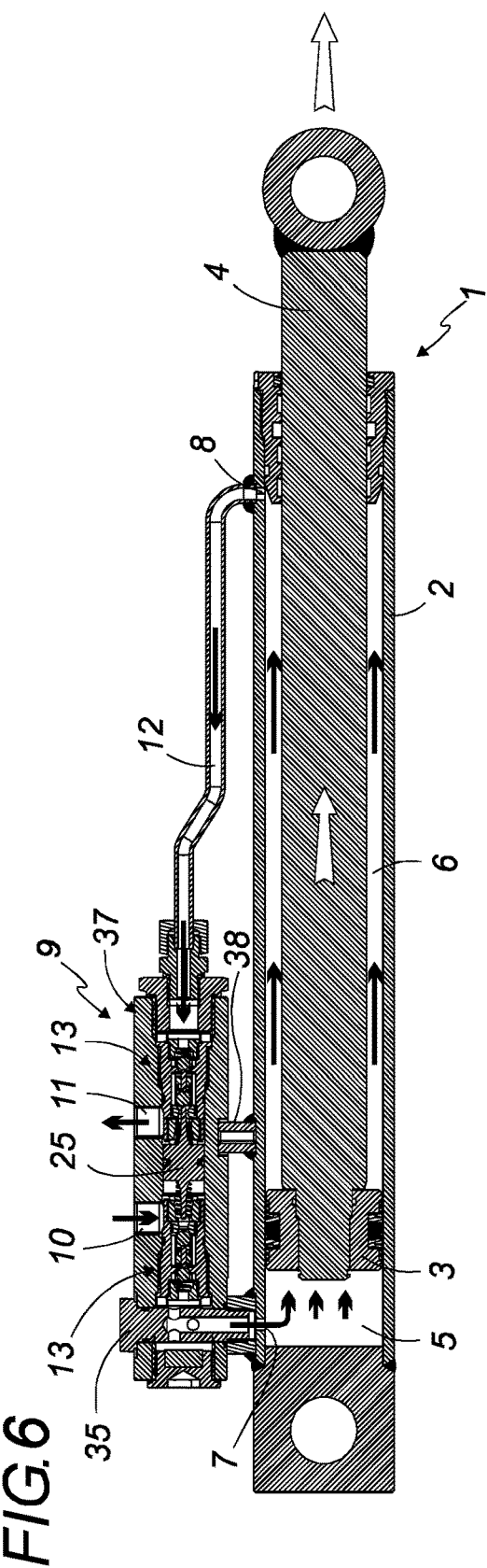
Figure 7:
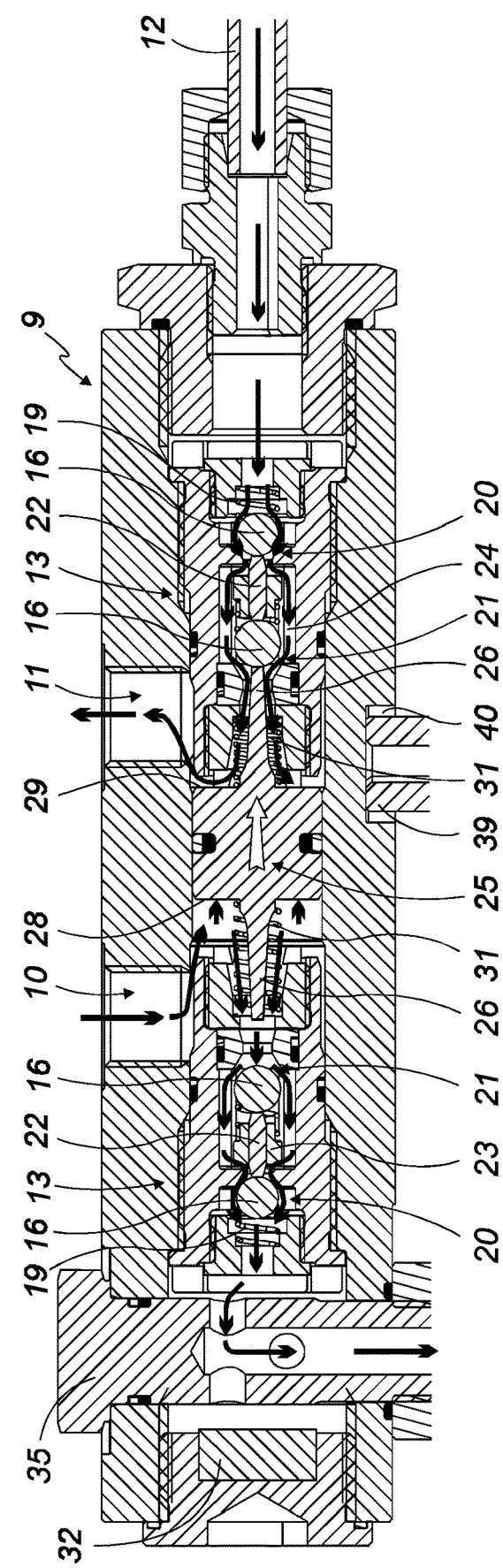

Deployment of the Rod of the Cylinder (FIGS. 6 and 7)

When the operator commands the deployment of the rod 4 of the cylinder 1, pressurized oil arrives through the inlet 10 of the security unit 9, in order to fill the bottom-side chamber 5 of the cylinder 1, by passing through the orifice 7. Said pressurized fluid, penetrating the device through the inlet 10, bears against the lateral face 28 of the control part 25 and pushes the latter far away from the bottom-side isolating device 13, toward the rod-side isolating device 13.

The pressurized fluid penetrates the bottom-side isolating device 13 and pushes the ball 16 of the secondary valve 21. Under the pressure from the fluid, the latter is released from its seat 17 and allows the pressurized fluid to enter, which next pushes the ball 16 of the primary valve 20, also releasing it from its seat 17. The bottom-side isolating device 13 is then completely open and on.

The pressurized hydraulic fluid continues its path until leaving the security unit 9 and penetrating the bottom-side chamber 5 of the cylinder 1 through the orifice 7 thereof. The pressurized oil pushes the piston 3, thus causing it to move toward the rod-side chamber 6 and the rod 4 to be deployed toward the outside of the cylinder.

At the same time, the hydraulic fluid present in the rod-side chamber 6, driven out by the movement of the piston 3, which reduces the volume of the rod-side chamber 6, escapes from the latter through the orifice 8 and follows the rigid conduit 12 to the security unit 9.

In the preferred alternative shown in FIGS. 6 and 7, said hydraulic fluid arrives at the second isolating device 13 of the security unit 9. Said rod-side isolating device 13 is forced open by the control part 25.

Indeed, as previously indicated, under the pressure from the hydraulic fluid entering through the inlet 10, the control part 25 has moved away from the secondary valve 21 of the bottom-side isolating device 13 and has simultaneously come closer to the secondary valve 21 of the rod-side isolating device 13, compressing the rod-side return spring 31 by said movement. The protruding lateral finger 26 originating from the lateral face 29 of the control part 25 then pushes the ball 16 of the secondary valve 21 outside the seat 17 thereof and thus forces the opening of the secondary valve 21 of the rod-side isolating device.

Driven by said protruding lateral finger 26, the ball 16 of the secondary valve 21 in turn pushes the corresponding end of the sliding rod 22 and drives it by its movement until pushing, by its other end, the ball 16 of the primary valve 20, forcing it to leave the seat 17 thereof. The primary valve 20 of said rod-side isolating device is therefore also open.

The hydraulic fluid leaving the rod-side chamber 6 of the cylinder 1 can therefore traverse the rod-side isolating device, the two valves 20 and 21 of which have been forced open by the movement of the control part 25. The hydraulic fluid then leaves the security unit 9 through the inlet 11 thereof to return to the reservoir.

When the rod 4 of the cylinder has reached the desired position, the operator stops the control of the hydraulic distributor and no more fluid arrives through the inlet 10 of the security unit 9. No more pressure is therefore exerted on the lateral face 28 of the control part 25, which returns to its central equilibrium position under the effect of the hydraulic pressure and of the return spring(s) 31 if they are provided. In this position, the control part 25 is separated from the isolating device(s) 13 and cannot control the opening of their valves. Indeed, its protruding lateral fingers 26 are too short to be in contact with the balls 16 of the adjacent secondary valves 21.

In the absence on the one hand of hydraulic fluid pressure for the bottom-side isolating device, and on the other hand of thrust by the protruding lateral finger 26 for the rod-side isolating device 13, the balls 16 of all the valves automatically return to center themselves on their seat 17 under the effect of the hydraulic pressure and of their respective return springs 19 if they are provided, and close said valves again sealably.

In most cases, the hydraulic pressure is sufficient to press the balls 16 on their respective seats 17 and to push the control part 25 back into the central position. Additionally, the greater the pressure is, the better the sealing is. When they are present, the return springs 19 and 31 are in fact merely an aid, an additional guarantee, to perform this function when the pressure is low.

The security unit 9 is then in the locked state.

Withdrawal of the Rod of the Cylinder (FIGS. 8 and 9)

When the operator commands the withdrawal of the rod 4 of the cylinder 1, pressurized oil this time arrives through the inlet 11 of the security unit 9, in order to fill the rod-side chamber 6 of the cylinder 1, by passing through the rigid conduit 12 and the orifice 8. Said pressurized fluid presses against the lateral face 29 of the control part 25 and pushes the latter toward the bottom-side isolating device.

In the case of the preferred alternative shown in FIGS. 8 and 9, said hydraulic fluid arrives at the rod-side isolating device, from which the control part 25 has moved away. The pressurized fluid pushes the ball 16 of its secondary valve 21, which moves away from the seat 17 thereof under the pressure. The pressurized fluid next pushes the ball 16 of the primary valve 20 and opens it in turn. The rod-side isolating device 13 is then completely open and on. The hydraulic fluid can thus traverse it and reach the rigid conduit 12 to fill the rod-side chamber 6 of the cylinder.

The pressurized oil pushes the piston 3 toward the bottom-side chamber 5, which causes the withdrawal of the rod 4 of the cylinder.

At the same time, the hydraulic fluid present in the bottom-side chamber 5, driven out by the movement of the piston 3, which reduces the volume of the bottom-side chamber 5, must be evacuated by the orifice 7 through the security unit 9.

Said hydraulic fluid arrives at the bottom-side isolating device of the security unit 9, which is forced open by the control part 25.

Indeed, as previously indicated, under the pressure from the hydraulic fluid entering through the inlet 11, the control part 25 has come closer to the bottom-side isolating device, compressing the return spring 31 located on the bottom side. Through said movement, the protruding lateral finger 26 of the lateral face 28 of the control part 25 is against the ball 16 of the secondary valve 21 of the bottom-side isolating device and pushes it outside its seat 17, thus forcing the opening of the secondary valve 21.

The ball 16 of the secondary valve 21 in turn pushes the corresponding end of the sliding rod 22 and drives it by its movement until it pushes, by the other end thereof, the ball 16 of the primary valve 20 out of its seat 17. The primary valve 20 of the bottom-side isolating device is therefore also open.

The hydraulic fluid leaving the bottom-side chamber 5 of the cylinder 1 can therefore traverse the bottom-side isolating device, the two valves 20 and 21 of which have been forced open by the movement of the control part 25. It next leaves the security unit 9 through the inlet 10 thereof to return to the reservoir.

When the rod 4 of the cylinder has reached the desired position, the operator stops the control of the hydraulic distributor and no more fluid arrives through the inlet 11 of the security unit 9. No more pressure is therefore exerted on the lateral face 29 of the control part 25, which returns to its central equilibrium position under the effect of the hydraulic pressure and of the return spring(s) 31 if they are provided. In this position, the control part 25 is separated from the isolating device(s) 13 and cannot control the opening of their valves.

In the absence on the one hand of hydraulic fluid pressure for the rod-side isolating device, and on the other hand of thrust by the protruding lateral finger 26 for the bottom-side isolating device, the balls 16 of all the valves automatically return to center themselves on their seat 17 under the effect of the hydraulic pressure and of their respective return springs 19 if they are provided, and close said valves again sealably.

The security unit 9 is then in the locked state.

Locked State (FIGS. 10 and 11)

In the absence of hydraulic fluid arriving through the inlets 10 and 11 of the security unit 9, corresponding to an absence of command by the operator, the device is in the locked state.

As shown, in the presence of springs 31, the control part 25 is in the central or quasi-central equilibrium position and its protruding lateral finger(s) 26 are separated from the secondary valves 21.

In the absence of springs 31, it is in a random position between the two secondary valves 21. However, even if one of its protruding lateral fingers 26 is in contact with the ball 16 of one of said secondary valves 21, the mass and the inertia of the control part 25 are too low for the protruding lateral finger 26 to be able to push the ball 16 enough to cause the secondary valve 21 in question to open without hydraulic pressure, for example under the effect of vibrations.

All the primary 20 and secondary 21 valves are in the closed position, all of the balls 16 resting sealably on their respective seats 17.

Likewise, in the various figures, the rods 22 have been shown bearing against the ball 16 of the primary valve 20. However, in reality, they are in a random position between the two balls 16 of the primary 20 and secondary 21 valves. Indeed, there is play between the sliding rods 22 and the balls 16 due to the length of the rods 22, which, by construction, is insufficient to touch both balls 16 at the same time. However, their mass and their inertia are too low for them to be able to push the ball 16 of the primary valves 20 enough to command them to open, under the effect of vibrations, for example.

Thus, the two bottom-side 5 and rod-side 6 chambers of the cylinder are locked sealably, the hydraulic fluid present in said chambers not being able to escape therefrom. The position of the rod is therefore blocked by blocking the hydraulic flow rate.

In the case of the preferred embodiment shown in FIGS. 10 and 11, this state is particularly safe, since the position of the rod in the loaded state is maintained even in case of internal leak between the two chambers of the cylinder. Indeed, in case of oil transfer from the bottom-side chamber 5 to the rod-side chamber 6, the pressure increases in both chambers 5, 6 of the cylinder. However, since the oil, which is incompressible, cannot escape through the isolating device 13 of the security unit 9, both successive valves of which are closed, the piston 3 cannot move and cause the rod 4 to withdraw by reducing the overall volume in which the fluid is located. The load is thus maintained in complete safety.

Obviously, the contemplated embodiments are not limited to the preferred embodiments described above and shown in the various figures, a person skilled in the art being able to make numerous modifications and imagine other embodiments without going beyond the framework and scope of the invention as recited by the claims.

The invention claimed is:

1. A series-connected dual-valve security unit that ensures, by locking the hydraulic flow, the holding in position of the rod of a double-acting hydraulic cylinder comprising a cylinder body, compartmentalized by a movable piston supporting said rod, into a bottom-side chamber and rod-side chamber, said chambers each communicating with a specific hydraulic conduit allowing the entry or exit of fluid into or out of the chamber in question, said security unit comprising:
  two isolating devices, each adapted to be mounted in one of the hydraulic conduits, each of the isolating devices adapted to supply one of said chambers of the cylinder, and each comprising a primary valve and a secondary valve, the primary valve being closest to the chamber in question, both passing in the same direction corresponding to the entry of fluid into the chamber in question and arranged one after the other in series;
  wherein the primary valve and the secondary valve of each of said isolating devices are ball-check valves, comprising a seat and a ball;
  wherein each of said isolating devices further includes:
    an independent sliding rod, arranged longitudinally and inserted between the balls of the primary and secondary valves, but not connected thereto, and able to slide toward each of said balls so as to press by one end thereof against the ball located in front, and
    a guide element for the sliding rod that provides guiding of the sliding rod while the sliding rod is sliding;
  and wherein, in each of said isolating devices, the length of the rod is provided to be short enough not to be able to be in contact simultaneously with both of the balls bearing on their respective seats when the two primary and secondary valves are closed; but long enough that the opening command of the secondary valve causes, through the movement of the ball thereof that pushes the corresponding end of the sliding rod, the guided sliding of the sliding rod toward the primary valve and causes the opening of the primary valve the ball whereof is pushed by the other end of the sliding rod,
  and wherein, in at least one of the isolating devices, the material of the balls or the material of the seats is different in the primary valve with respect to the secondary valve.

2. The security unit according to claim 1, wherein the guide element is a substantially cylindrical guide support in which the sliding rod is mounted, which slides in a guided manner in a bore provided for the ball of the primary valve; and wherein said bore or the guide support includes at least one longitudinal slot allowing the passage of the hydraulic fluid despite the presence of the sliding rod and the guide support in the bore.

3. The security unit according to claim 1, further comprising a single body in which the two isolating devices are housed.

4. The security unit according to claim 1, wherein the two isolating devices include a single control part able alternately to cause the secondary valve of each of the two isolating devices to open.

5. The security unit according to claim 4, wherein the single control part is a sliding central shuttle arranged between the two isolating devices, able to move alternately toward each of said isolating devices, and which, when the sliding central shuttle arrives near one of said isolating devices, causes the secondary valve thereof to open.

6. The security unit according to claim 4, wherein the control part includes two protruding lateral fingers, each extending toward one of the isolating devices, and the free end of which pushes the ball of the secondary valve of said isolating device when the control part arrives near the latter, thus causing the secondary valve to open, said two protruding lateral fingers being provided to be short enough so that the free ends thereof cannot be in contact simultaneously with both balls of the two secondary valves when said balls are bearing on their respective seats in the closed position of the secondary valves.

7. The security unit according to claim 4, wherein each of the lateral faces of the control part is in communication with one of the hydraulic conduits; and wherein the control part includes a perimetric gasket that opposes the passage of hydraulic fluid from one hydraulic conduit to the other.

8. The security unit according to claim 1, further comprising at least one magnetized part that attracts polluting metal particles that may be present in the hydraulic fluid.

9. A security double-acting hydraulic cylinder, comprising:
a cylinder body;
a rod;
a piston that compartmentalizes the cylinder body into a bottom-side chamber and a rod-side chamber, said chambers each communicating with a specific hydraulic conduit allowing the entry or exit of fluid into or out of the chamber in question; and a security unit comprising:
two isolating devices, each adapted to be mounted in one of the hydraulic conduits, each of the isolating devices adapted to supply one of said chambers of the cylinder, and each comprising a primary valve and a secondary valve, the primary valve being closest to the chamber in question, both passing in the same direction corresponding to the entry of fluid into the chamber in question and arranged one after the other in series;
wherein the primary valve and the secondary valve of each of said isolating devices are ball-check valves, comprising a seat and a ball;
wherein each of said isolating devices further includes:
an independent sliding rod, arranged longitudinally and inserted between the balls of the primary and secondary valves, but not connected thereto, and able to slide toward each of said balls so as to press by one end thereof against the ball located in front, and
a guide element for the sliding rod that provides guiding of the sliding rod while the sliding rod is sliding;
and wherein, in each of said isolating devices, the length of the rod is provided to be short enough not to be able to be in contact simultaneously with both of the balls bearing on their respective seats when the two primary and secondary valves are closed; but long enough that the opening command of the secondary valve causes, through the movement of the ball thereof that pushes the corresponding end of the sliding rod, the guided sliding of the sliding rod toward the primary valve and causes the opening of the primary valve the ball whereof is pushed by the other end of the sliding rod,
and wherein, in at least one of the isolating devices, the material of the balls or the material of the seats is different in the primary valve with respect to the secondary valve.

10. The hydraulic cylinder according to claim 9, wherein the security unit is integrated into or directly fastened onto the cylinder body.

11. The hydraulic cylinder according to claim 10, wherein the security unit is fastened onto the cylinder body using a hollow screw through which the bottom-side chamber is placed in hydraulic communication with the primary valve of the corresponding isolating device.

12. The hydraulic cylinder according to claim 10, wherein the security unit rests on a pin fastened on the cylinder body, the free end of said pin being engaged in an oblong cavity arranged in the security unit and oriented longitudinally, i.e., along the main axis of the security unit, in order to allow longitudinal play.

13. A series-connected dual-valve security unit that ensures, by locking the hydraulic flow, the holding in position of the rod of a double-acting hydraulic cylinder comprising a cylinder body, compartmentalized by a movable piston supporting said rod, into a bottom-side chamber and rod-side chamber, said chambers each communicating with a specific hydraulic conduit allowing the entry or exit of fluid into or out of the chamber in question, said security unit comprising:
two isolating devices, each adapted to be mounted in one of the hydraulic conduits, each of the isolating devices adapted to supply one of said chambers of the cylinder, and each comprising a primary valve and a secondary valve, the primary valve being closest to the chamber in question, both passing in the same direction corresponding to the entry of fluid into the chamber in question and arranged one after the other in series;
wherein the primary valve and the secondary valve of each of said isolating devices are ball-check valves, comprising a seat and a ball;
wherein each of said isolating devices further includes:
an independent sliding rod, arranged longitudinally and inserted between the balls of the primary and secondary valves, but not connected thereto, and able to slide toward each of said balls so as to press by one end thereof against the ball located in front, and
a guide element for the sliding rod that provides guiding of the sliding rod while the sliding rod is sliding;
and wherein, in each of said isolating devices, the length of the rod is provided to be short enough not to be able to be in contact simultaneously with both of the balls bearing on their respective seats when the two primary and secondary valves are closed; but long enough that the opening command of the secondary valve causes, through the movement of the ball thereof that pushes the corresponding end of the sliding rod, the guided sliding of the sliding rod toward the primary valve and causes the opening of the primary valve the ball whereof is pushed by the other end of the sliding rod, and wherein the guide element is a substantially cylindrical guide support in which the sliding rod is mounted, which slides in a guided manner in a bore provided for the ball of the primary valve; and wherein said bore or the guide support includes at least one longitudinal slot allowing the passage of the hydraulic fluid despite the presence of the sliding rod and the guide support in the bore.

14. The security unit according to claim 13, wherein in at least one of the isolating devices, the primary valve and the secondary valve are not identical.

15. The security unit according to claim 14, wherein said primary valve and said secondary valve are different in at least one of the following features: the material of the ball or the seat or the diameter of the ball.

16. A series-connected dual-valve security unit that ensures, by locking the hydraulic flow, the holding in position of the rod of a double-acting hydraulic cylinder comprising a cylinder body, compartmentalized by a movable piston supporting said rod, into a bottom-side chamber and rod-side chamber, said chambers each communicating with a specific hydraulic conduit allowing the entry or exit of fluid into or out of the chamber in question, said security unit comprising:

two isolating devices, each adapted to be mounted in one of the hydraulic conduits, each of the isolating devices adapted to supply one of said chambers of the cylinder, and each comprising a primary valve and a secondary valve, the primary valve being closest to the chamber in question, both passing in the same direction corresponding to the entry of fluid into the chamber in question and arranged one after the other in series;

at least one magnetized part that attracts polluting metal particles that may be present in the hydraulic fluid;

wherein the primary valve and the secondary valve of each of said isolating devices are ball-check valves, comprising a seat and a ball;

wherein each of said isolating devices further includes:

an independent sliding rod, arranged longitudinally and inserted between the balls of the primary and secondary valves, but not connected thereto, and able to slide toward each of said balls so as to press by one end thereof against the ball located in front, and a guide element for the sliding rod that provides guiding of the sliding rod while the sliding rod is sliding;

and wherein, in each of said isolating devices, the length of the rod is provided to be short enough not to be able to be in contact simultaneously with both of the balls bearing on their respective seats when the two primary and secondary valves are closed; but long enough that the opening command of the secondary valve causes, through the movement of the ball thereof that pushes the corresponding end of the sliding rod, the guided sliding of the sliding rod toward the primary valve and causes the opening of the primary valve the ball whereof is pushed by the other end of the sliding rod.

17. The security unit according to claim 16, wherein in at least one of the isolating devices, the primary valve and the secondary valve are not identical.

18. The security unit according to claim 17, wherein said primary valve and said secondary valve are different in at least one of the following features: the material of the ball or the seat or the diameter of the ball.

* * * * *